J. B. RELYEA.
Vehicle-Top.
No. 167,022.
Patented Aug. 24, 1875.
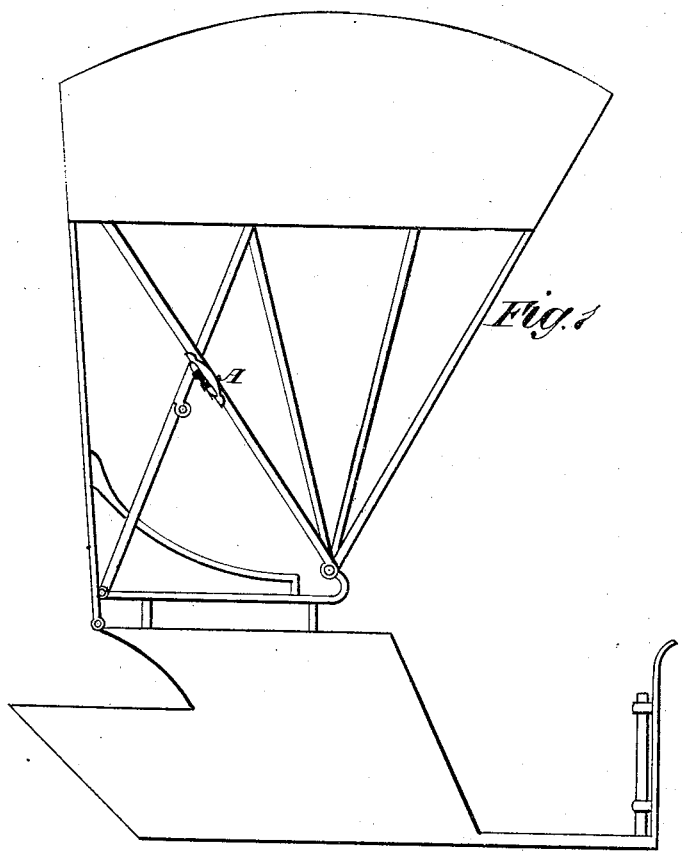
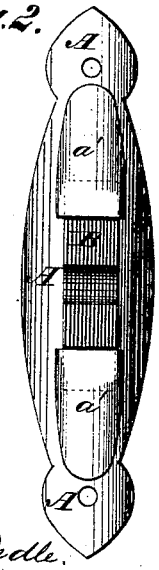
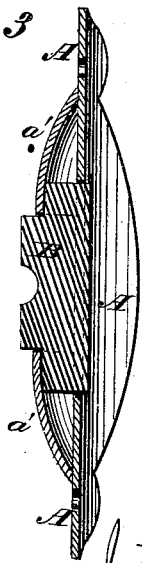
WITNESSES:
Francis McArdle
A. F. Terry
INVENTOR:
J. B. Relyea
BY
ATTORNEYS.

UNITED STATES PATENT OFFICE.

JEROME B. RELYEA, OF HICKSVILLE, ASSIGNOR TO HIMSELF AND LEWIS E. BREWSTER, OF BRYAN, OHIO.

IMPROVEMENT IN VEHICLE-TOPS.

Specification forming part of Letters Patent No. 167,022, dated August 24, 1875; application filed June 12, 1875.

*To all whom it may concern:*

Be it known that I, JEROME B. RELYEA, of Hicksville, in the county of Defiance and State of Ohio, have invented a new and useful Improvement in Buggy-Top-Bow Protector, of which the following is a specification:

Figure 1 is a side view of my improved device, shown as applied to the bow of a buggy-top. Fig. 2 is a face view of the same. Fig. 3 is a detail longitudinal section of the same.

Similar letters of reference indicate corresponding parts.

The invention will first be described in connection with drawing, and then pointed out in claim.

A is the case or base plate of the device, which is concaved upon its inner side to fit upon the rear bow of a buggy-top, and has holes in its ends to receive the screws by which it is secured to said bow. In the middle part of the concaved plate A is formed a slot to receive the rubber block B, the inner edge of which is designed to rest against the bow to which the device is attached. Upon the end parts of the outer sides of the concaved plate A are formed, or to it are attached, two projections or caps, $a'$, the inner ends of which are at a less distance apart than the length of the slot in the plate A, to form shoulders for the shoulders formed upon the end parts of the outer edge of the rubber block B to rest against, to prevent the said rubber block from falling out, while allowing the middle part of said rubber block to project to rest upon the prop-block when the top is lowered. The projecting middle part of the rubber block B may be hollowed out or concaved to fit upon the prop-block, and thus prevent the bow from playing back and forth when the top is lowered.

I am aware that it is not new to use an elliptic spring on rear bow to support weight of top and prevent injury from jolting; but

What I claim is—

An attachment for the rear bow of a vehicle, consisting of a rubber block, B, concaved in the middle, and projecting beyond the cap-holders $a'$ $a'$ of plate A, as and for the purpose specified.

JEROME B. RELYEA.

Witnesses:
 THOMAS GITHENS,
 NORMAN RELYEA.